(No Model.)

J. W. HUDSON.
CULTIVATOR.

No. 307,048.   Patented Oct. 21, 1884.

Attest:
W. H. Knight
H. J. Bernhard

Inventor:
John W. Hudson
per Edson Bro's,
Attorneys (No Model.)
J. W. HUDSON.
CULTIVATOR.
No. 307,048.　　　　　　　　　　Patented Oct. 21, 1884.
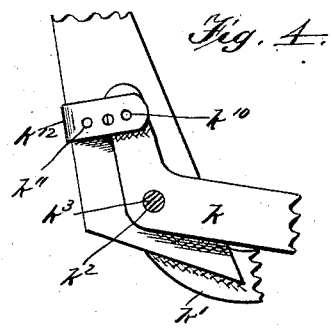
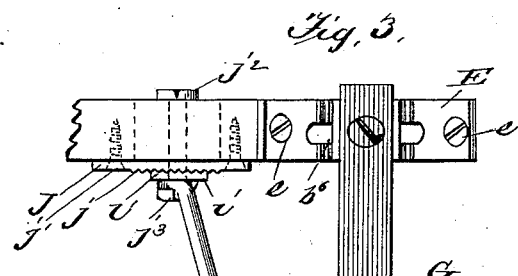
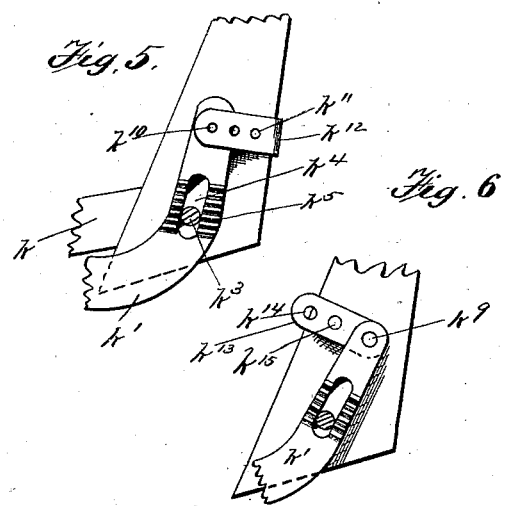
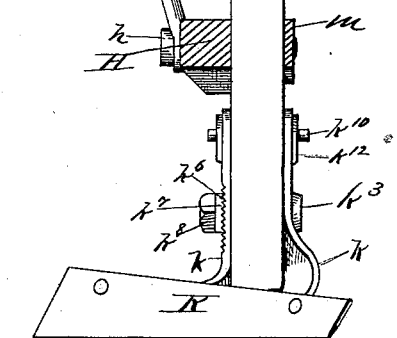
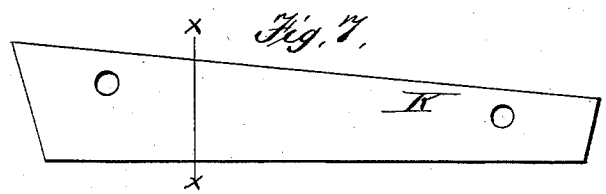

UNITED STATES PATENT OFFICE.

JOHN W. HUDSON, OF WELLINGTON, ILLINOIS.

CULTIVATOR.

SPECIFICATION forming part of Letters Patent No. 307,048, dated October 21, 1884.

Application filed April 22, 1884. (No model.)

*To all whom it may concern:*

Be it known that I, JOHN W. HUDSON, a citizen of the United States, residing at Wellington, in the county of Iroquois and State of Illinois, have invented certain new and useful Improvements in Cultivators; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to cultivators of the class known as "Gopher" cultivators, and has for its object the provision of an implement having means whereby the cutters or scrapers may be adjusted nearer to or farther from each other and at different angles with respect to a horizontal plane.

The invention has, further, for its object the provision of a cutter or scraper blade, the opposite ends of which are of different widths, whereby said cutter is adapted to be turned end for end to suit different kinds of plants.

To the accomplishment of the above the invention consists in the construction and arrangement of parts, substantially as hereinafter more fully set forth, and pointed out in the claims.

Figure 1:
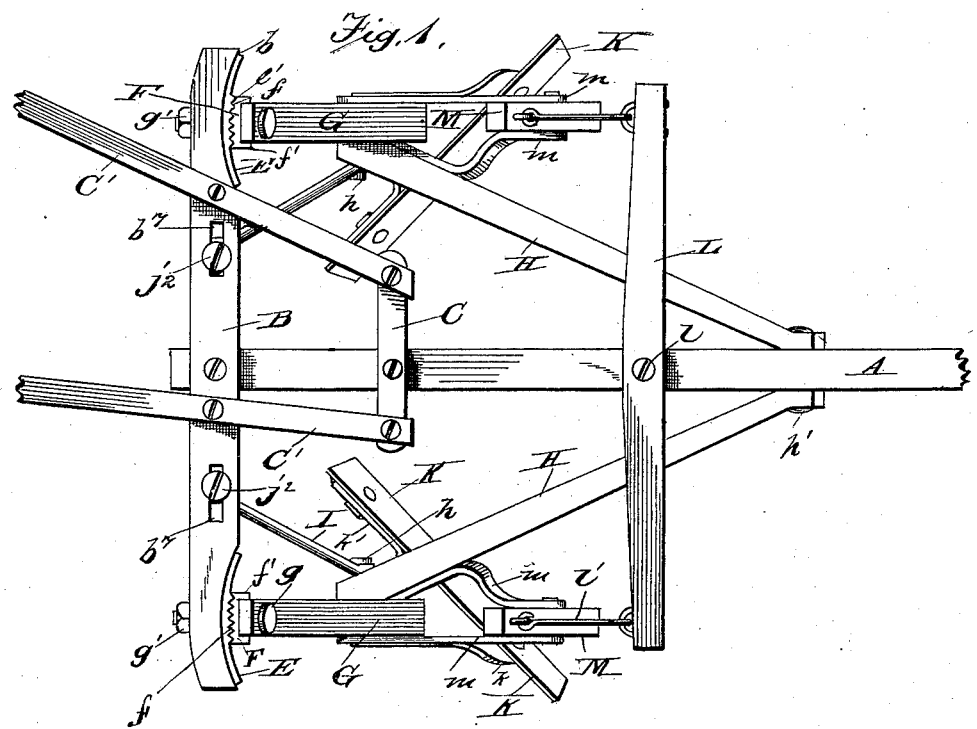
Figure 2:
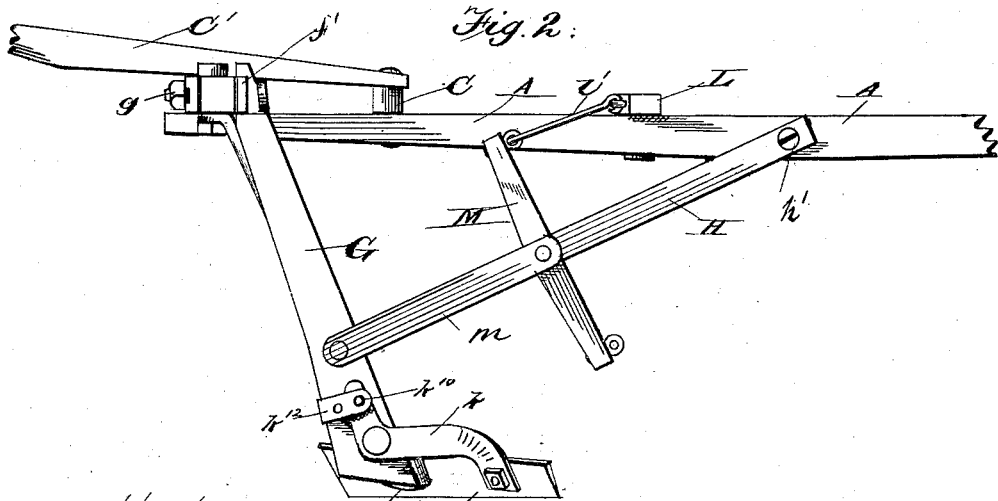

In the drawings, which form a part of this specification, Figure 1 is a top plan view of my improved cultivator. Fig. 2 is a side elevation thereof. Fig. 3 is a front elevation of one of the standards and its attached scraper-blades. Figs. 4 and 5 are views of opposite sides of the foot of the standard, and show the manner in which the scraper-blades are attached to and adjusted upon the standards. Fig. 6 is a modification of the view shown in Fig. 5. Fig. 7 is a detail view of one of the scraper-blades detached, and Fig. 8 is a sectional view taken on the line $x$ $x$ of Fig. 7.

Referring to the drawings, in which like letters of reference indicate like parts, A designates the pole or tongue of the cultivator, provided at its rear end with a cross bar or timber, B, the ends of which are equidistant from the pole or tongue.

C designates a short transverse timber, secured to the pole, to the outer ends of which, upon the upper surface thereof, are secured the ends of handles C', that extend rearward inclining to one side, and are secured to the cross-bar B. The bar B is at each end and upon the forward side thereof provided with a short curved portion, $b$, fitted with a curved plate, E, secured thereto, provided with corrugations $e'$, with which engage similar corrugations, $f$, formed upon the rear surface of the shoes F, having flanges $f'$, between which is secured the upper end of standard G by bolts $g$, that pass through said standards and shoe, and into and through a slot, $b^6$, formed in the end of the bar. The bolts $g$ are provided with screw-threaded rear ends, and are held in position by nuts $g'$. G designates the standards secured to the bars, as described, and extending thence downward and forward, as shown. The standards are firmly held by braces H, secured at their lower ends by bolts $h$ to said standards, and at their upper ends to the tongue by a bolt, $h'$. Lateral movement or adjustment of the standards G is effected by means of rods I, the lower ends of which are secured to the bolts $h$ of the braces H, and thence extend upwardly and inwardly to the bar B, at which point they bear against plates $i$, provided with corrugated upper surfaces, $i'$, that engage with similar corrugations, $j$, upon the lower surfaces of plates J, secured to the bar B by screws $j'$ or otherwise. The rods I are held in position by bolts $j^2$, that pass downward through slots $b^7$ in the cross-timber B, and corresponding slots in the plates J, and thence into and through the heads of the rods I, where they are provided with nuts $j^3$. By this described construction it will be seen that the foot of either standard may be moved nearer to or farther from the middle of the machine, for the accommodation of narrow or wide hills or rows of grain.

K designates cutter or scraper blades, secured by brace-irons $k$ $k'$ to the lower ends of the standards G. The blades are preferably made tapering, as shown in Fig. 7, for a purpose hereinafter described. $k$ $k'$ designate brace-irons secured at their lower ends to the blades K, and extending thence to the foot of each standard. The outside braces, $k$, are fulcrumed at $k^2$, Fig. 4, upon bolts $k^3$, that pass through the foot of each standard. The inner braces, $k'$, are provided with slots $k^4$, through which the bolts $k^3$ pass. The inner face of each of the inside braces, $k'$, is provided with corrugations $k^5$, that engage with similar corrugations, $k^6$, formed upon a washer, $k^7$, held in position by a nut, $k^8$, upon the bolt $k^3$. By raising or lowering the braces $k'$ the inner or rear end of each of the blades K will be raised or lowered, as will be readily understood. From the bolt $k^3$ the braces $k$ $k'$ extend upward for a short distance, and are provided near their upper ends with apertures $k^9$, through which wooden pins $k^{10}$ pass. The pins $k^{10}$ pass through any desired one of a series of apertures formed in the standard, and also through corresponding apertures, $k^{11}$, formed in loops or straps $k^{12}$, that are secured at their centers to the rear surface of the standards.

In practice, when large obstructions are struck by the blades and strain is thereby brought upon the pins $k^{10}$, they will break, and thus allow the blade to pass under the standard and avoid breaking the cultivator.

In Fig. 6 of the drawings I show a modified form of the loops $k^{12}$, in which links $k^{13}$ are secured to the tops of the brace-irons, said links being provided with apertures $k^{14}$ and wooden pins $k^{15}$. The blades K differ in width at their ends, in order that plants having different degrees of growth may have the earth raised to a proper height about them, which will be the case when said blades are transposed or changed from one side to the other, in view of which the bolts that secure the brace-irons $k$ $k'$ to the blades are removable.

L designates a horizontal double-tree or evener, fulcrumed to the top of the tongue at $l$, each end of the evener being attached by a rod, $l'$, to the upper ends of vertical doubletrees M, fulcrumed between the outer ends of straps $m$, extending from the standards.

From the foregoing description it will be seen that a cultivator made in accordance with my invention is easily and readily adjusted, strong, and durable.

I am aware that modifications in detail in construction may be made without departing from the spirit or sacrificing the advantages of the invention, and I therefore claim the right to make such changes as fairly fall within the scope or limit of my invention.

What I claim as my invention, and desire to secure by Letters Patent of the United States, is—

1. In a cultivator, the combination of a scraper-blade having ends of unequal widths, in combination with standards and means, substantially as described, for adjusting such blades and standards, substantially as described, and for the purpose set forth.

2. In a cultivator, standards G, provided at their lower ends with adjustable blades K, the ends thereof being of unequal width, in combination with the pole A, bar B, plates E $e'$, shoes F $f$ $f'$, bolts $g$, and rods I, whereby both the upper and lower ends of the standards can be adjusted nearer to or further from the middle of the machine, substantially as shown and described.

3. In a cultivator, the pole A, connected at its rear end with a transverse bar, B, having longitudinal and vertical slots formed therein, in combination with standards G, provided at their lower ends with cutter or scraper blades, the corrugated, slotted, and curved braces $k$ $k'$, and means for securing said braces to the standards, as and for the purpose set forth.

4. In a cultivator, the combination of the pole A, cross-bar B, having slots $b^6$ $b^7$, and recessed portions $b$, provided with curved and corrugated plate E, with standards G, provided at their lower ends with adjustable scraper-blades K, substantially as described.

5. In a cultivator, and in combination with the cross-bar E, provided with corrugated surface $e$, shoe F and standard G, whereby the upper end of the standard can be adjusted, substantially as described.

6. In a cultivator, a standard provided at its upper end with a shoe, F, the rear surface of which is corrugated, in combination with a curved plate, E, having a corrugated forward surface, $e$, and slot, bar B, and bolt $g$, for holding said standard at any desired point, as and for the purpose set forth.

7. In a cultivator, the combination of the scraper-blades K with adjustable brace $k$ $k'$, constructed substantially as described, having upwardly-extending arms, slot $k^4$, corrugations $k^5$, and strap $k^{12}$, as and for the purpose set forth.

8. In a cultivator, the combination of the scraper-blades provided with braces $k$ $k'$, constructed substantially as described, with the standards G, straps $k^{12}$, and wooden pins $k^{10}$, as and for the purpose set forth.

In testimony whereof I affix my signature in presence of two witnesses.

JOHN W. HUDSON.

Witnesses:
HUZEB MALO,
SAMUEL MALO.